United States Patent
Kuriyama et al.

(10) Patent No.: US 8,292,996 B2
(45) Date of Patent: Oct. 23, 2012

(54) OILY INKJET INK

(75) Inventors: Katsumi Kuriyama, Ibaraki-ken (JP); Kengo Sugaya, Ibaraki-ken (JP); Kenji Yamada, Ibaraki-ken (JP)

(73) Assignee: Riso Kagaku Corporation (JP)

( * ) Notice: Subject to any disclaimer, the term of this patent is extended or adjusted under 35 U.S.C. 154(b) by 0 days.

(21) Appl. No.: 12/979,826

(22) Filed: Dec. 28, 2010

(65) Prior Publication Data

US 2011/0226157 A1    Sep. 22, 2011

(30) Foreign Application Priority Data

Mar. 19, 2010  (JP) ................................. 2010-088137

(51) Int. Cl.
*C09D 11/02*    (2006.01)
(52) U.S. Cl. .................................... 106/31.6; 106/31.86
(58) Field of Classification Search ................. 106/31.6, 106/31.86
See application file for complete search history.

(56) References Cited

U.S. PATENT DOCUMENTS

| | | | | |
|---|---|---|---|---|
| 3,917,639 A | * | 11/1975 | Paget et al. | 540/130 |
| 3,936,315 A | * | 2/1976 | Ferrill et al. | 106/412 |
| 4,289,698 A | * | 9/1981 | Stepp | 540/138 |
| 7,060,125 B2 | | 6/2006 | Ohkawa et al. | |
| 7,799,123 B2 | | 9/2010 | Endo et al. | |
| 2003/0177948 A1 | * | 9/2003 | Ohkawa et al. | 106/31.86 |
| 2007/0022904 A1 | * | 2/2007 | Kitawaki et al. | 106/31.86 |
| 2007/0101901 A1 | * | 5/2007 | Endo et al. | 106/31.86 |

FOREIGN PATENT DOCUMENTS

JP    2009-144126 A    7/2009

* cited by examiner

*Primary Examiner* — Melvin C Mayes
*Assistant Examiner* — Veronica F Faison
(74) *Attorney, Agent, or Firm* — Studebaker & Brackett PC; Donald R. Studebaker

(57) ABSTRACT

An oily inkjet ink comprises a pigment, a dispersant, and an organic solvent. The organic solvent contains an ester solvent and/or an alcohol solvent. A containing quantity of a water-soluble ingredient in the pigment is equal to at most 0.15% by mass.

4 Claims, No Drawings

OILY INKJET INK

BACKGROUND OF THE INVENTION

1. Field of the Invention

This invention relates to an oily inkjet ink. This invention particularly relates to an oily inkjet cyan ink, which suppresses accumulation of a solid material in the vicinity of nozzles of an inkjet head, and which suppresses jetting-out failure.

2. Description of the Related Art

Inkjet recording systems are the systems in which an inkjet ink having a high degree of fluidity is jetted out in the form of ink droplets from fine head nozzles, and in which an image is recorded by the ink droplets on a printing medium, such as paper. Recently, the inkjet recording systems have rapidly become popular for the possibility of the printing of an image having a high resolution and good image quality by use of a comparatively cheap apparatus. As the inks for use in the inkjet recording systems, there have been proposed various oily inkjet inks, which contain a water-insoluble solvent and a pigment finely dispersed in the water-insoluble solvent.

For example, in U.S. Pat. No. 7,799,123, the applicant proposed an ink, which contains a non-polar solvent, such as an ester solvent, an alcohol solvent, or a hydrocarbon solvent, and a pigment dispersed in the non-polar solvent. The proposed ink has the advantages in that the ink has excellent on-printer stability, and in that the ink yields a printed surface, which does not adhere to a print surface having been printed with an electrophotographic system.

However, ordinarily, in cases where an oily inkjet ink is used for a long period of time in an inkjet printer, a solid material accumulates in the vicinity of the nozzles of the inkjet head. The solid material having thus accumulated obstructs the normal ink jetting-out operation and often causes image failure to occur. Heretofore, it has been considered that the ink clogging is caused to occur by an increase in ink viscosity due to thickening of the ink in the nozzles, coarse particles floating in the ink due to dispersing failure, and pigment agglomerates arising through a change with the passage of time due to bad dispersing stability of pigments. (Reference may be made to, for example, U.S. Pat. No. 7,060,125.)

The ink clogging described above induces jetting-out defects, such as flight bending and scattering of ink droplets, and is therefore undesirable. Therefore, heretofore, in accordance with the aforesaid causes, studies have been conducted on means for suppression of the increase in viscosity by selection of a solvent, a resin, or the like, separation and removal of agglomerated particles by control of a mean particle diameter of the pigment, or suppression of pigment agglomeration by adsorption of a specific dispersant to the pigment.

However, the inventors eagerly conducted study and have found that the jetting-out defects, such as the flight bending and the scattering of the ink droplets, markedly occurs, particularly, with a cyan ink, and that the solid material having agglomerated in the vicinity of the nozzles of the head having been introduced with the cyan ink is actually a water-soluble solid material, regardless of the agglomerated solid material being derived from the oily ink.

The water-soluble solid material is derived from a copper phthalocyanine pigment, which is used as a coloring material in the cyan ink. The water-soluble solid material is dissolved and condensed in water, which is contained in a trace quantity in the ink. Since water is apt to evaporate in the vicinity of the nozzle, the water-soluble solid material deposits due to the evaporation of water and accumulates in the vicinity of the nozzle.

Particularly, in the cases of an oily inkjet ink containing organic solvents having hydrophilic groups, such as an ester solvent and an alcohol solvent, there is a tendency for the water quantity in the ink to increase due to moisture absorption, and the like. Therefore, the water-soluble solid material is apt to be extracted by water in the ink. It has thus been found that the oily inkjet ink containing the organic solvents having the hydrophilic groups, such as the ester solvent and the alcohol solvent, is the ink susceptible to the accumulation of the solid material in the vicinity of the nozzles.

SUMMARY OF THE INVENTION

The primary object of the present invention is to provide an oily inkjet ink, which has excellent storage stability, which suppresses accumulation of a water-soluble solid material in the vicinity of nozzles of an inkjet head, and which suppresses jetting-out failure.

Another object of the present invention is to provide an oily inkjet cyan ink, which has excellent storage stability, which suppresses accumulation of a water-soluble solid material in the vicinity of nozzles of an inkjet head, and which suppresses jetting-out failure.

The present invention provides an oily inkjet ink, comprising a pigment, a dispersant, and an organic solvent, wherein the organic solvent contains an ester solvent and/or an alcohol solvent, and a containing quantity of a water-soluble ingredient in the pigment is equal to at most 0.15% by mass.

The oily inkjet ink in accordance with the present invention should preferably be modified such that the containing quantity of the water-soluble ingredient in the pigment is equal to at most 0.11% by mass.

The containing quantity of the water-soluble ingredient in the pigment may be calculated in the manner described below. Specifically, 4 g of the pigment and 40 g of ion-exchanged water are introduced into a 50 ml glass bottle, and the resulting mixture is processed for one hour with a stirrer, such as a rocking mill. A pigment dispersion having thus been obtained is filtered through a 0.2 μm membrane filer made of PTFE. The containing quantity of the water-soluble ingredient in the pigment is then calculated from the weight of a residue obtained from 10 g of the filtrate having thus been obtained.

As described above, in the cases of the conventional oily inkjet inks, the approaches for solving the problems of the nozzle clogging were to use a formulation capable of suppressing the increase in ink viscosity at the ink preparation stage, to contrive the dispersing technique for suppressing the pigment agglomeration, and to use the specific pigment dispersant. Thus the conventional approaches for solving the problems of the nozzle clogging were not the approach to the suppression of the accumulation of the water-soluble solid material in the vicinity of the nozzle, which water-soluble solid material is the cause of the problems to be solved by the present invention. Therefore, with the conventional oily inkjet inks, in spite of the inks aiming at the suppression of the increase in ink viscosity and the pigment agglomeration, it often occurs that the nozzle jetting-out stability is not enhanced to a sufficiently satisfactory level due to the accumulation of the water-soluble solid material.

With the oily inkjet ink in accordance with the present invention, wherein the pigment in which the containing quantity of the water-soluble ingredient is equal to at most 0.15% by mass is used, little water-soluble solid material accumulates in the vicinity of the nozzle. The decrease of the containing quantity of the water-soluble ingredient in the pigment is the approach enabling both the anion of a carboxylic acid, or the like, and the cation of a metal, or the like, to be decreased. Therefore, with the oily inkjet ink in accordance with the present invention, the accumulation of the solid material in the vicinity of the nozzle is suppressed more efficiently than with the approaches for selectively decreasing only the anion or for selectively decreasing only the cation.

Such that the good storage stability is obtained, and such that the reliable jetting-out performance is obtained for a long period of time, it is preferable to employ the oily inkjet ink, comprising a pigment, a dispersant, and an organic solvent, wherein the organic solvent contains the ester solvent and/or the alcohol solvent, and wherein the containing quantity of the water-soluble ingredient in the pigment is equal to at most 0.15% by mass.

DETAILED DESCRIPTION OF THE INVENTION

The oily inkjet ink in accordance with the present invention will hereinbelow be described in detail.

The oily inkjet ink in accordance with the present invention (hereinbelow referred to simply as the ink) is characterized by containing the pigment in which the containing quantity of the water-soluble ingredient is equal to at most 0.15% by mass. Preferably, the ink in accordance with the present invention is characterized by containing the pigment in which the containing quantity of the water-soluble ingredient is equal to at most 0.11% by mass. Of the oily inkjet inks, it has not yet been clarified sufficiently why the cyan ink is susceptible to the accumulation of the water-soluble solid material. However, it is presumed that the copper phthalocyanine pigment has the characteristics such that the pigment is apt to take in water-soluble impurities, such as organic acids and metals, which are contained in large proportions in industrial water from the industrial water used in pigment synthesizing and producing steps, and such that the pigment is apt to release the water-soluble impurities. It is also presumed that, in cases where the containing quantity of the water-soluble ingredient is set to be equal to at most 0.15% by mass, the water-soluble solid material, which clings to the positions in the vicinity of the nozzles, and the water-soluble solid material, which is removed by the jetting-out operation, are cancelled. It is thus presumed that, since the clinging of the water-soluble solid material to the positions in the vicinity of the nozzles does not continue, there is no risk of the water-soluble solid material accumulating in the vicinity of the nozzles, and the jetting-out failure does not occur.

There are various techniques for decreasing the containing quantity of the water-soluble ingredient, such as a carboxylic acid salt, in the pigment. Examples of the techniques for decreasing the containing quantity of the water-soluble ingredient in the pigment include a technique wherein the pigment is washed with purified water, a technique wherein the pigment is washed with an acid and purified water, and a technique wherein water having a high purity is used at the time of the production of the pigment. Specifically, the ink in accordance with the present invention may be prepared by setting the containing quantity of the water-soluble ingredient in the pigment to be equal to at most 0.15% by mass with respect to the quantity of the pigment, preferably at most 0.11% by mass with respect to the quantity of the pigment.

The containing quantity of the water-soluble ingredient in the pigment may be calculated in the manner described below. Specifically, 4 g of the pigment and 40 g of ion-exchanged water are introduced into a 50 ml glass bottle, and the resulting mixture is processed for one hour with a rocking mill (manufactured by Seiwa Giken Co., Ltd.). A pigment dispersion having thus been obtained is filtered through a 0.2 μm membrane filer made of PTFE. Thereafter, 10 g of the filtrate having thus been obtained is heated to remove water by evaporation, and the weight of the residue having thus been obtained is measured. The containing quantity of the water-soluble ingredient in the pigment is then calculated from the weight of the residue.

The pigment used in the ink in accordance with the present invention should preferably be the copper phthalocyanine pigment in which the containing quantity of the water-soluble ingredient is equal to at most 0.15% by mass, and should more preferably be the copper phthalocyanine pigment in which the containing quantity of the water-soluble ingredient is equal to at most 0.11% by mass.

The adding quantity of the pigment should preferably fall within the range of 0.5% by mass to 10% by mass with respect to the total quantity of the ink, and should more preferably fall within the range of 3% by mass to 7% by mass with respect to the total quantity of the ink.

In the cases of the pigment in which the containing quantity of the water-soluble ingredient is equal to at most 0.09% by mass, even though the adding quantity of the pigment falls within the range of 10% by mass to 20% by mass with respect to the total quantity of the ink, the effect of suppressing the jetting-out failure is obtained.

It has not yet been clarified sufficiently why the containing quantity of the water-soluble ingredient in the ink, which containing quantity is necessary for the acquisition of the effects of the ink in accordance with the present invention, does not exhibit a simple proportional relationship with the adding quantity of the pigment with respect to the total quantity of the ink. However, it is presumed that there is an influence of the allowable quantity of the water-soluble ingredient, which the pigment is capable of retaining, or an influence of balance of cancellation between the accumulation of the water-soluble solid material at the nozzles and the removal of the water-soluble solid material by the jetting-out operation.

If the adding quantity of the pigment is larger than 20% by mass with respect to the total quantity of the ink, the ink viscosity will become markedly high and undesirable. If the adding quantity of the pigment is smaller than 0.5% by mass with respect to the total quantity of the ink, the image density will become markedly low and undesirable.

In the ink in accordance with the present invention, the organic solvent should preferably contain the ester solvent and/or the alcohol solvent in a total containing quantity of at least 20% by mass, and should more preferably contain the ester solvent and/or the alcohol solvent in a total containing quantity of at least 40% by mass.

In cases where the ester solvent and/or the alcohol solvent is contained in a total containing quantity of at least 20% by mass in the organic solvent, the storage stability of the ink becomes good. In cases where the ester solvent and/or the alcohol solvent is contained in a total containing quantity of at least 40% by mass in the organic solvent, the long-term storage stability of the ink is obtained.

The organic solvent employed in the ink in accordance with the present invention is not limited to the ester solvent and the alcohol solvent. Examples of the organic solvents other than the ester solvent and the alcohol solvent include hydrocarbon solvents, higher fatty acid solvents, and ether solvents. Each of the above-enumerated organic solvents may be used alone. Alternatively, two or more of the above-enumerated organic solvents may be used in combination.

Examples of the ester solvents include methyl laurate, isopropyl laurate, isopropyl myristate, isopropyl palmitate, isooctyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate, and glyceryl tri-2-ethylhexanoate.

Examples of the alcohol solvents include isomyristyl alcohol, isopalmityl alcohol, isostearyl alcohol, and oleyl alcohol.

Examples of the hydrocarbon solvents include aliphatic hydrocarbon solvents, alicyclic hydrocarbon solvents, and aromatic hydrocarbon solvents. Examples of the aliphatic hydrocarbon solvents and the alicyclic hydrocarbon solvents include the solvents commercially available under the following trade names: Teclean N-16, Teclean N-20, Teclean N-22, Solvent 0 L, Solvent 0 M, Solvent 0 H, AF-4, AF-5, AF-6, AF-7, Nisseki Isosol, and Nisseki Naphtesol (each of which is manufactured by Nippon Oil Corporation); and Isopar G, Isopar H, Isopar L, Isopar M, Exxol D40, Exxol D80, Exxol D100, Exxol D130, and Exxol D140 (each of which is manufactured by Exxon Mobil Corporation).

Examples of the higher fatty acid solvents include nonanoic acid, isononanoic acid, isomyristic acid, hexadecanoic acid, isopalmitic acid, oleic acid, and isostearic acid.

Examples of the ether solvents include diethylene glycol monobutyl ethers, ethylene glycol monobutyl ethers, propylene glycol monobutyl ethers, and propylene glycol dibutyl ethers.

The adding quantity of the organic solvent used in the ink in accordance with the present invention should preferably be equal to at least 60% by mass with respect to the total quantity of the ink, and should more preferably fall within the range of 70% by mass to 98% by mass with respect to the total quantity of the ink.

In so far as the pigment dispersant has the effect of dispersing a used coloring material in a stable state in the solvent, no limitation is imposed upon the pigment dispersant. Examples of the dispersants include the dispersants commercially available under the following trade names: Solsperse 5000 (a copper phthalocyanine derivative), Solsperse 11200, Solsperse 13940 (a polyester amine type), Solsperse 17000, Solsperse 18000 (a fatty acid amine type), Solsperse 22000, Solsperse 24000, and Solsperse 28000 (each of which is manufactured by The Lubrizol Corporation); Efka 400, Efka 401, Efka 402, Efka 403, Efka 450, Efka 451, Efka 453 (a modified polyacrylate), Efka 46, Efka 47, Efka 48, Efka 49, Efka 4010, Efka 4050, and Efka 4055 (a modified polyurethane) (each of which is manufactured by EFKA Chemicals B.V.); Demol P, Demol EP, Poiz 520, Poiz 521, Poiz 530, and Homogenol L-18 (a polycarboxylic acid type polymeric surface active agent) (each of which is manufactured by Kao Corp.); Disparon KS-860 and Disparon KS-873N4 (an amine salt of a polymeric polyester) (each of which is manufactured by Kusumoto Chemicals, Ltd.); and Discole 202, Discole 206, Discole OA-202, and Discole OA-600 (a poly-chain polymeric nonionic type) (each of which is manufactured by Dai-ichi Kogyo Seiyaku Co., Ltd.).

EXAMPLES

The present invention will further be illustrated by the following non-limitative examples.

Preparation of Copper Phthalocyanine Pigment
(Water-Soluble Ingredient Decreased Pigment)

A copper phthalocyanine (Cyanine Blue KRG, manufactured by Sanyo Color Works. Ltd.) was mixed with ion-exchanged water such that the containing quantity of the copper phthalocyanine might be equal to 10% by mass, and the resulting mixture was subjected to stirring and dispersing processing for one hour. Thereafter, the thus obtained dispersion was subjected to filtration and drying processing. In this manner, a water-soluble ingredient decreased pigment of the copper phthalocyanine (KRG) was obtained. The thus obtained pigment was taken as a copper phthalocyanine blue pigment a.

Also, a copper phthalocyanine (Cyanine Blue 4044, manufactured by Sanyo Color Works. Ltd.) was mixed with ion-exchanged water such that the containing quantity of the copper phthalocyanine might be equal to 10% by mass, and the resulting mixture was subjected to stirring and dispersing processing for one hour. Thereafter, the thus obtained dispersion was subjected to filtration and drying processing. In this manner, a water-soluble ingredient decreased pigment of the copper phthalocyanine (4044) was obtained. The thus obtained pigment was taken as a copper phthalocyanine blue pigment b.

Thereafter, a copper phthalocyanine blue pigment c was prepared by making reference to the method described in Japanese Unexamined Patent Publication No. 2009-144126. Specifically, the copper phthalocyanine (Cyanine Blue KRG, manufactured by Sanyo Color Works. Ltd.) was mixed with hot water having been adjusted at pH 2 by the addition of hydrochloric acid and having been adjusted at a temperature of 80° C., such that the containing quantity of the copper phthalocyanine might be equal to 10% by mass, and the resulting mixture was subjected to stirring and dispersing processing for one hour. Thereafter, the thus obtained dispersion was subjected to filtration and water washing processing. Thereafter, filtration and drying processing was performed. In this manner, the copper phthalocyanine blue pigment c was prepared.

Measurement of Water-Soluble Ingredient in
Pigment

The containing quantity of the water-soluble ingredient in the pigment was calculated in the manner described below. Specifically, 4 g of the copper phthalocyanine pigment and 40 g of ion-exchanged water were introduced into a 50 ml glass bottle, and the resulting mixture was processed for one hour with a rocking mill (manufactured by Seiwa Giken Co., Ltd.). A pigment dispersion having thus been obtained was filtered through a 0.2 μm membrane filer made of PTFE. Thereafter, 10 g of the filtrate having thus been obtained was heated to remove water by evaporation, and the weight of the residue having thus been obtained was measured. The containing quantity of the water-soluble ingredient in the pigment was then calculated from the weight of the residue. Table 1 shows the results of the calculation.

Inks were prepared in the manner described below by use of the water-soluble ingredient decreased pigments, and the like.

Preparation of Ink

Raw materials were premixed in accordance with each of formulations shown in Table 1 below. (Values shown in Table 1 are expressed in terms of parts by mass.) Thereafter, the resulting mixture was subjected to a dispersing process for approximately 10 minutes in a bead mill. In this manner, each of inks in Examples 1 to 3 and Comparative Examples 1 to 3 was prepared. With respect to each of the inks having thus been prepared, each of the items described below was measured and evaluated.

Storage Stability

Each of the inks having been prepared was introduced into a closed container and left to stand under a 70° C. environment for three months. Thereafter, the change of the ink viscosity was measured, and the results of the measurement were evaluated in accordance with the criterion shown below. The viscosity was the value obtained at 10 Pa at the time at which a shear stress was increased from 0 Pa at a rate of 0.1 Pa/s at a temperature of 23° C. The viscosity was measured by use of Rheometer RS (manufactured by Thermo Haake Corp., Ltd.).

⊚: The viscosity change rate was lower than 5%.
○: The viscosity change rate was lower than 10%.

sition of the dot occurred, was counted. Also, the number of the nozzles, with which the deviation of the position of droplet deposition of the dot occurred, was measured with respect to all nozzles (100). In this manner, the jetting-out failure occurrence rate was measured. The results of the measurement were evaluated in accordance with the criterion shown below. Table 1 shows the results of the evaluation together with each of ink formulations.

⊚: The jetting-out failure occurrence rate was lower than 5%.

○: The jetting-out failure occurrence rate was lower than 50%.

x: The jetting-out failure occurrence rate was at least 50%.

TABLE 1

|  |  |  | Example 1 | Example 2 | Example 3 |
|---|---|---|---|---|---|
| Pigment | Copper phthalocyanine blue a | Water-soluble ingredient decreased pigment of KRG | 5 |  |  |
|  | Copper phthalocyanine blue b | Water-soluble ingredient decreased pigment of 4044 |  | 5 |  |
|  | Copper phthalocyanine blue c | Water-soluble ingredient decreased pigment of KRG |  |  | 5 |
|  | Copper phthalocyanine blue A | KRG |  |  |  |
|  | Copper phthalocyanine blue B | 4044 |  |  |  |
| Dispersant | Basic polymeric dispersant | Solsperse 11200 | 3 | 3 | 3 |
| Solvent | Ester solvent | Isooctyl palmitate | 30 | 30 | 30 |
|  | Alcohol solvent | Isostearyl alcohol | 12 | 12 | 12 |
|  | Hydrocarbon solvent | Normal Paraffin M | 50 | 50 | 50 |
|  | Total |  | 100 | 100 | 100 |
| Containing quantity of water-soluble ingredient (% by mass) in pigment |  |  | 0.12 | 0.12 | 0.11 |
| Storage stability |  |  | ○ | ○ | ⊚ |
| Jetting-out failure occurrence rate |  |  | ○ | ○ | ⊚ |

|  |  |  | Comparative Example 1 | Comparative Example 2 | Comparative Example 3 |
|---|---|---|---|---|---|
| Pigment | Copper phthalocyanine blue a | Water-soluble ingredient decreased pigment of KRG |  |  |  |
|  | Copper phthalocyanine blue b | Water-soluble ingredient decreased pigment of 4044 |  |  |  |
|  | Copper phthalocyanine blue c | water-soluble ingredient decreased pigment of KRG |  |  |  |
|  | Copper phthalocyanine blue A | KRG | 5 |  | 5 |
|  | Copper phthalocyanine blue B | 4044 |  | 5 |  |
| Dispersant | Basic polymeric dispersant | Solsperse 11200 | 3 | 3 | 3 |
| Solvent | Ester solvent | Isooctyl palmitate | 30 | 30 |  |
|  | Alcohol solvent | Isostearyl alcohol | 12 | 12 |  |
|  | Hydrocarbon solvent | Normal Paraffin M | 50 | 50 | 92 |
|  | Total |  | 100 | 100 | 100 |
| Containing quantity of water-soluble ingredient (% by mass) in pigment |  |  | 0.17 | 0.20 | 0.17 |
| Storage stability |  |  | Δ | Δ | X |
| Jetting-out failure occurrence rate |  |  | X | X | — |

Δ: The viscosity change rate was lower than 20%.
x: The viscosity change rate was at least 20%.

Jetting-Out Failure Occurrence Rate

Each of the inks having been prepared was introduced into an inkjet printer "ORPHIS HC5500" (trade name, manufactured by Riso Kagaku Corporation), and continuous printing of a 300 dpi*300 dpi solid image at 5 drop/dot for a period of time of 10 hours was performed one time per week. The operation was continued for six months. The solid image printed after six months was investigated, and the number of nozzles, with which a deviation of a position of droplet depo- As shown in Table 1, as for each of the inks prepared in Examples 1 to 3 in accordance with the present invention, in which the ester solvent and the alcohol solvent were contained, and in which the containing quantity of the water-soluble ingredient in the pigment was equal to at most 0.15% by mass, the storage stability of the ink was good, and the jetting-out failure occurrence rate of the nozzles was low. Particularly, as for the ink prepared in Example 3 in accordance with the present invention, in which the containing quantity of the water-soluble ingredient in the pigment was equal to 0.11% by mass, the jetting-out failure occurrence rate of the nozzles was markedly low, and the storage stability of the ink was excellent. Though it has not been clarified sufficiently why the aforesaid effects of each of the inks prepared in Examples 1 to 3 in accordance with the present invention were obtained, it is presumed that, by virtue of the decrease of the containing quantity of the water-soluble ingredient in the pigment, the polarity of the pigment surfaces was activated, and the adsorption of the pigment to the dispersant was enhanced.

As for each of the inks prepared in Comparative Examples 1 and 2, in which the ester solvent and the alcohol solvent were contained, but in which the containing quantity of the water-soluble ingredient in the pigment was larger than 0.15% by mass, though the storage stability of the ink was not markedly bad, the jetting-out failure occurrence rate of the nozzles was high. Also, as for the ink prepared in Comparative Example 3, in which the total containing quantity of the ester solvent and/or the alcohol solvent in the organic solvent was smaller than 20% by mass, the storage stability was bad.

What is claimed is:

1. An oily inkjet ink, comprising:
   a copper phthalocyanine pigment,
   a dispersant, and
   an organic solvent,
   wherein the organic solvent contains an ester solvent and/or an alcohol solvent, and
   a containing quantity of a water-soluble ingredient in the pigment is equal to at most 0.15% by mass.

2. An oily inkjet ink as defined in claim 1 wherein the containing quantity of the water-soluble ingredient in the pigment is equal to at most 0.11% by mass.

3. An oily inkjet ink as defined in claim 1 wherein the organic solvent contains the ester solvent and/or the alcohol solvent in a total containing quantity of at least 20% by mass.

4. An oily inkjet ink as defined in claim 2 wherein the organic solvent contains the ester solvent and/or the alcohol solvent in a total containing quantity of at least 20% by mass.

* * * * *